United States Patent Office 3,297,701
Patented Jan. 10, 1967

3,297,701
SYNTHESIS OF DIAZABICYCLO-(2,2,2)-OCTANE AND DERIVATIVES
Walter H. Brader, Jr., and Richard L. Rowton, Austin, Tex., assignors to Jefferson Chemical Company, Inc., Houston, Tex., a corporation of Delaware
No Drawing. Filed May 28, 1964, Ser. No. 371,098
19 Claims. (Cl. 260—268)

This application is a continuation-in-part of abandoned Brader et al. applications Serial No. 317,761 and Serial No. 317,814, both filed October 21, 1963, which are, in turn, continuation-in-part applications of abandoned Brader et al. application Serial No. 182,122, filed April 23, 1962, and entitled, "Synthesis of Heterocyclic Compounds."

This invention relates to the preparation of bicyclo-heterocyclic compounds. More particularly, this invention relates to an improved method for the production of diazabicyclo-(2.2.2)-octane and C-substituted diazabicyclo-(2.2.2)-octanes.

It has heretofore been proposed to prepare diazabicyclo-(2.2.2)-octane by cyclizing a compound such as ethylenediamine, diethylenetriamine, triethylenetetramine or N-aminoethylpiperazine in the presence of a silicaalumina or tungsten catalyst. However, past results have not been entirely satisfactory for a number of reasons. For example, the reaction conditions which are necessary to promote cyclization are so severe that a catalyst of the type heretofore employed also promotes cracking and condensation reactions involving not only feed materials but also reaction products, whereby diazabicyclo-(2.2.2)-octane has been obtained in only small yield and whereby the total reaction product is characterized by the presence of a wide variety of undesired products which not only detract from the economics of the process through poor yields of triethylenediamine, but further detract because of the added expense and care that is necessary in order to obtain pure triethylenediamine from the crude reaction mixture.

For example, among the by-products that are formed are piperazine and N-alkylpiperazines and a variety of pyrazine derivatives which have physical and chemical properties closely related to the physical and chemical properties of diazabicyclo-(2.2.2)-octane whereby physical separation by conventional techniques such as distillation of fractional crystallization are only partially effective.

In contrast to the foregoing and in accordance with the present invention, there is provided a new process for the production of diazabicyclo-(2.2.2)-octane and C-substituted diazabicyclo-(2.2.2)-octanes by contacting a metal phosphate catalyst with a compound having the formula:

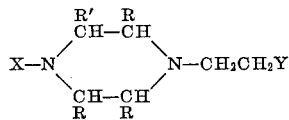

or a compound having the formula:

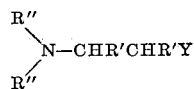

wherein:

R is selected from the group consisting of hydrogen, alkyl groups containing 1 to 12 carbon atoms and cycloalkyl groups containing 6 to 12 carbon atoms;

R' is selected from the group consisting of hydrogen and alkyl groups containing 1 to 4 carbon atoms;

R" is selected from the group consisting of hydrogen and —CHR'CHR'Y;

X is selected from the group consisting of hydrogen and —CH$_2$CH$_2$Y; and

Y is selected from the group consisting of —OH and —NH$_2$.

Representative examples of suitable feed stocks falling within the first formula which are useful in the practice of the present invention include N-aminoethylpiperazine, N - hydroxyethylpiperazine, N,N' - (diaminoethyl)piperazine, N,N'-(dihydroxyethyl)piperazine, N - (hydroxyethyl) - 2 - methylpiperazine, N,N' - (dihydroxyethyl)-2-methylpiperazine, N-(aminoethyl)-2-methylpiperazine, N,N' - (diaminoethyl) - 2 - methylpiperazine, N - (hydroxyethyl) - 2 - ethylpiperazine, N,N'-(dihydroxyethyl)-2-ethylpiperazine, N-(aminoethyl)-2-ethylpiperazine, N-(hydroxyethyl) - 2 - butylpiperazine, N,N' - (dihydroxyethyl) - 2 - butylpiperazine, N - (hydroxyethyl) - 2 - dodecylpiperazine, N-(aminoethyl)-2-dodecylpiperazine, N-(hydroxyethyl) - 2 - cyclohexylpiperazine, N - (hydroxyethyl) - 2 - hexylcyclohexylpiperazine, N - (hydroxyethyl)-2,5-dimethylpiperazine, N,N'-(dihydroxyethyl)-2,5-dimethylpiperazine, N - (hydroxyethyl) - 2,3,5,6 - tetramethylpiperazine, N - (aminoethyl) - 2,5 - dimethylpiperazine, N-(hydroxyethyl)-2,5-diethylpiperazine, N,N'-(dihydroxyethyl)-2,5-diethylpiperazine, etc., and mixtures thereof.

The hydroxyethyl—and di(hydroxyethyl)—feed stocks of the present invention may be conveniently prepared, for example, by ethoxylating piperazine or a C-substituted piperazine with ethylene oxide. Preferably, a molar excess of ethylene oxide is used in order to obtain substantially complete conversion of the piperazine compound. As a consequence, a preferred feed stock will constitute a mixture of N-hydroxyethyl and N,N'-(dihydroxyethyl)-piperazines.

The aminoethyl—and di(aminoethyl)—feed stocks may be prepared, for example, by reacting ethyleneimine with the piperazine or a C-substituted piperazine.

Representative examples of compounds falling within the second formula include monoethanolamine, diethanolamine, triethanolamine, monoisopropanolamine, diisopropanolamine, triisopropanolamine, sec. butanolamine, di-sec. butanolamine, di-sec. hexanolamine, sec. hexanolamine, aminoethylethanolamine, aminopropyl ethanolamine, aminopropyl propanolamine, N-(hydroxyethyl) di-ethylenetriamine, N-(hydroxypropyl) diethylenetriamine, N - 2 - hydroxybutyl) diethylenetriamine, N - (hydroxyethyl) dipropylenetriamine, N-(hydroxypropyl) dipropylenetriamine, N-(2-hydroxybutyl) dipropylenetriamine, ethylenediamine, diethylenetriamine, 1,2 - propylenediamine, di-1,2-propylenetriamine, etc., and mixtures thereof.

As has been indicated, the catalysts of the present invention are metal phosphates. Examples of metal phosphate catalysts that have been used successfully in accordance with the present invention include aluminum phosphate, boron phosphate, iron phosphate, calcium phosphate, lithium phosphate, zinc phosphate, nickel phosphate, chromium phosphate, copper phosphate and cobalt phosphate. It will be understood, of course, that mixtures of two or more of such phosphates may also be utilized in accordance with the present invention.

The preferred metal phosphate catalysts to be employed in accordance with the present invention are selected from the group consisting of aluminum, calcium and iron phosphates. Superior results are obtained with aluminum phosphate.

Although the feed materials to be employed may be substantially anhydrous, it is within the scope of the present invention to use aqueous feed stocks containing up to about 50 wt. percent of water.

The cyclization reaction may be conducted in the absence of ammonia, but in accordance with the preferred embodiment of the present invention, the reaction is conducted in the presence of from about 1 to about 15 mols of ammonia per mol of substituted piperazine feed stock. More preferably, from 3 to about 10 mols of ammonia are employed.

Hydrogen may also be employed in the process, for example, as a purge or carrier gas.

Although the reaction is preferably conducted at atmospheric pressure, subatmospheric or superatmospheric pressures may be employed, if desired. It is generally preferable to conduct the reaction in vapor phase.

The reaction temperature to be employed is preferably within the range of 250° to about 550° C., and still more preferably within the range of about 350° to about 450° C.

However, when the feed stock is a compound falling within the second formula, the catalyst to be employed should be an aluminum phosphate and the reaction should be conducted under the above-described conditions except that from 1 to 15 mols (and preferably 3 to 10 mols) of ammonia should be employed per mol of feed stock.

The invention will be further illustrated by the following specific examples, which are given by way of illustration and not as limitations on the scope of this invention.

*Example I*

N-aminoethylpiperazine was reacted over an 86% silica-12% alumina catalyst having an initial surface area of about 411 m.²/g. The reaction conditions were: 378° C., 1 atmosphere, an N-aminoethylpiperazine flow rate of 1.22 g./cc. catalyst/hour and an ammonia flow rate of 0.64 g./cc. catalyst/hour. The total reactor effluent was condensed in a flask immersed in a Dry Ice-acetone bath and to which was attached a Dry Ice-acetone condenser. The product was distilled and cut into an overhead fraction boiling through N-aminoethylpiperazine and a residue fraction. The overhead fraction was analyzed by vapor phase chromatography. The results are shown:

N-aminoethylpiperazine conversion, percent by wt. __ 100
Mol percent yield of piperazine _____ 17
Mol percent yield of triethylenediamine _____ 23

*Example II*

In essentially the same way as in Example I, N-aminoethylpiperazine was reacted over 50 cc. of 4–8 mesh aluminum phosphate. The reaction conditions were: 375° C., 1 atmosphere pressure, an N-aminoethylpiperazine flow rate of 1.15 g./cc. catalyst/hour and an ammonia flow of 0.59 g./cc. catalyst/hour. The product analysis gave the following results:

N-aminoethylpiperazine conversion, percent by wt. __ 83
Mol percent yield of piperazine _____ 40
Mol percent yield of triethylenediamine _____ 39

*Example III*

To illustrate the use of ammonia, N-aminoethylpiperazine was reacted over aluminum phosphate at 375° C., 1 atmosphere pressure and an N-aminoethylpiperazine flow rate of 1.90 g./cc. catalyst/hour. The product was analyzed and the following results obtained:

N-aminoethylpiperazine conversion, percent by wt. __ 81
Mol percent yield of piperazine _____ 36
Mol percent yield of triethylenediamine _____ 29

The above examples are intended to show the superior results that are obtained when aluminum phosphate is used to catalyze the conversion of N-aminoethylpiperazine to triethylenediamine. In Examples I and II in which the reactions were carried out under approximately the same conditions, the piperazine yield using aluminum phosphate was 2.35 times that using silica-alumina while the triethylenediamine yield was 1.7 times higher with aluminum phosphate. Thus, superior yields of both piperazine and triethylenediamine occur with the aluminum phosphate catalyst. When ammonia was used in the reaction, the triethylenediamine and piperazine yields were increased by factors of 1.35 and 1.11, respectively, over those runs where ammonia was not used.

*Example IV*

In essentially the same manner as in Example I, boron phosphate was used to catalyze the conversion of N-aminoethylpiperazine. The reaction conditions were: 380° C., 1 atmosphere pressure, an N-aminoethylpiperazine flow rate of 1.17 g./cc. catalyst/hour and an ammonia flow rate of 0.82 g./cc. catalyst/hour. The results of the experiment are shown below:

N-aminoethylpiperazine conversion, percent by wt. _ 76
Mol percent yield of piperazine _____ 29.3
Mol percent yield of triethylenediamine _____ 10

*Example V*

In essentially the same manner as in Example I, iron phosphate was used to catalyze the conversion of N-aminoethylpiperazine. The reaction conditions were: 412° C., 1 atmosphere pressure, an N-aminoethylpiperazine flow rate of 1.1 g./cc. catalyst/hour and an ammonia flow rate of 0.6 g./cc. catalyst/hour. The results are shown below:

N-aminoethylpiperazine conversion, percent by wt. __ 45
Mol percent yield of piperazine _____ 31
Mol percent yield of triethylenediamine _____ 28

*Example VI*

In essentially the same manner as in Example I, a number of other metal phosphate catalysts were used to catalyze the conversion of N-aminoethylpiperazine. The reaction conditions employed, all at one atmosphere pressure, and the results obtained are set forth in the following table:

TABLE I

| Catalyst | Temp., °C. | N-aminoethyl-piperazine flow rate, g./cc. catalyst/hr. | Ammonia flow rate, g./cc. catalyst/hr. | Conversion, percent | Piperazine yield, mol percent | TEDA yield, mol percent |
|---|---|---|---|---|---|---|
| Zinc phosphate | 374 | 1.2 | 0.8 | 26 | 7 | 4 |
| Nickel phosphate | 375 | 1.7 | 1.3 | 27 | 12 | 3 |
| Chromium phosphate | 380 | 1.2 | 1.0 | 56 | 18 | 6 |
| Copper phosphate | 372 | 1.3 | 0.9 | 100 | 13 | 7 |
| Cobalt phosphate | 375 | 1.2 | 0.8 | 66 | 3 | 2 |

Example VII

In essentially the same manner as in Example I, calcium phosphate was used to catalyze the conversion of N-aminoethylpiperazine. The reaction conditions were: 380° C., 1 atmosphere pressure, an N-aminoethylpiperazine flow rate of 1.2 g./cc. catalyst/hour and an ammonia flow rate of 0.52 g./cc. catalyst/hour. The results are shown below:

N-aminoethylpiperazine conversion, percent by wt. -- 62
Piperazine yield, mol percent -------------------- 20
Triethylenediamine, mol percent yield ------------ 27

Example VIII

In essentially the same manner as in Example I, lithium phosphate was used to catalyze the conversion of N-aminoethylpiperazine. The conditions were: 375° C., 1 atmosphere pressure, an N-aminoethylpiperazine flow rate of 1.2 g./cc. catalyst/hour and an ammonia flow rate of 1.2 g./cc. catalyst/hour. The results are shown below:

N-aminoethylpiperazine conversion, percent by wt. -- 24
Piperazine yield, mol percent -------------------- 25
Triethylenediamine yield, mol percent ------------ 12

Example IX 2-methyltriethylenediamine, hereafter sometimes called MTEDA, was prepared by the cyclization of N-hydroxyethyl-3-methylpiperazine over an aluminum phosphate catalyst in a cylindrically shaped 1-inch by 30.5-inch stainless steel reactor fitted with a jacket containing Dowtherm; the reaction temperature was achieved by refluxing the Dowtherm and adjusting the pressure on the Dowtherm until the desired temperature was obtained. The reaction procedure involved pumping N-hydroxyethyl-3-methylpiperazine at a weight/hourly/space/velocity of 0.35 and metering ammonia through a rotameter at a weight/hourly/space/velocity, hereafter sometimes called WHSV, of 0.1 into the top of the reactor maintained at atmospheric pressure. The reactor contained about 100 ml. of catalyst located in the center of the reactor and supported on a stand. The space above the catalyst was filled with Beryl saddles and was used as a preheater. The reactor effluent which passed from the reactor was collected and distilled. After the water was removed, a MTEDA rich fraction boiling above 100° to about 200° C. was taken and the column then put under vacuum in order to remove unreacted feed. These fractions were analyzed by vapor phase chromatography for constituent analysis.

Using the above procedure, 2-methyltriethylenediamine was obtained. The following results were calculated:

Reactor temperature, ° C. ----------------------- 400
N-hydroxyethyl-3-methylpiperazine conversion, percent ---------------------------------------- 100
MTEDA, yield, wt. percent ---------------------- 50
TEDA yield, wt. percent ------------------------ 2
Residue yield, wt. percent ---------------------- 7
Pyrazine yield, small.

The product of this example, 2-methyltriethylenediamine, is an unusual and unexpected compound. For example, triethylenediamine is a white crystalline hygroscopic solid having a melting point of 158° to 160° C. and a boiling point of 173° to 174° C. Because of the propensity with which it sublimes in pure form, it is not practical to utilize triethylenediamine, per se, and it is normally used in the form of an aqueous or organic solvent solution. This is disadvantageous when it is to be employed as a catalyst in the preparation of polyurethane foams and is of particular disadvantage when an anhydrous system is desired (e.g., in preparation of rigid polyurethane foam, urethane elastomers, etc.). The compound 2-methyltriethylenediamine, on the other hand, is a colorless liquid having a boiling point of 186° C. and a melting point below −50° C. which does not sublime under ambient conditions of temperature and pressure and which is less hygroscopic than triethylenediamine. As a consequence, it can be handled in pure form with only normal precautions and can be used with ease in anhydrous systems where triethylenediamine is used, if at all, only with great difficulty.

Pertinent vapor pressure data with respect to methyltriethylenediamine is as follows:

| Temperature, ° C.: | Vapor pressure, mm. Hg |
|---|---|
| 75.0 | 20.5 |
| 85.0 | 32.0 |
| 95.0 | 48.0 |
| 100.0 | 58.0 |
| 110.0 | 83.0 |
| 120.0 | 110.0 |
| 130.0 | 168.0 |
| 150.0 | 297.0 |
| 170.0 | 515.0 |
| 180.0 | 660.0 |
| 186.0 | 760.0 |

Example X

In essentially the same manner as in Example IX, N,N'-dihydroxyethylmethylpiperazine was converted over an aluminum phosphate catalyst. The reactor conditions were: 398° C., a feed WHSV of 0.17 and an ammonia WHSV of 0.1. The following results were obtained:

Feed conversion, percent ----------------------- 100
Yield MTEDA, wt. percent ---------------------- 40
Yield TEDA, wt. percent ------------------------ 2
Yield bottoms, wt. percent ---------------------- 19

Example XI

In essentially the same manner as in Example IX, a mixture of 75% N-hydroxyethyl-3-methylpiperazine and 25% N,N'-dihydroxyethylmethylpiperazine was converted over an aluminum phosphate catalyst at 400° C., a feed WHSV of 3.0 and an ammonia WHSV of 0.1. The following results were obtained.

Feed conversion, percent ----------------------- 100
Yield MTEDA, wt. percent ---------------------- 48
Yield TEDA, wt. percent ------------------------ 3
Yield residue, wt. percent ---------------------- 8

Example XII

In essentially the same manner as in Example IX, N-hydroxypropyl-3-methylpiperazine was converted over an aluminum phosphate catalyst at 400° C. and feed and ammonia space velocities of 0.5 and 0.1, respectively. The following results were obtained:

Conversion, percent --------------------------- 100
Yield MTEDA, wt. percent ---------------------- 9
Yield N-allylpiperazine, wt. percent -------------- 20
Yield piperazine, wt. percent -------------------- 17
Yield TEDA, wt. percent ------------------------ 0.6
Yield residue, wt. percent ---------------------- 29

Example XIII

In essentially the same manner as in Example IX, a mixture of 75% N-hydroxypropylpiperazine and 25% H₂O was converted over an aluminum phosphate catalyst at 400° C. and feed and ammonia weight/hourly/space/velocities of 0.5 and 0.1, respectively. The following results were obtained:

Feed conversion, percent ----------------------- 100
Yield MTEDA, wt. percent ---------------------- 13
Yield N-allylpiperazine, wt. percent -------------- 20
Yield piperazine, wt. percent -------------------- 15
Yield residue, wt. percent ---------------------- 21

Example XIV

In essentially the same manner as in Example I, a mixture of N,N'-dihydroxypropylpiperazine, 77%, and 23% water was converted over an aluminum phosphate catalyst at 400° C. and feed and ammonia weight/hourly/space/velocities of 0.9 and 0.1, respectively. The following resutls were obtained:

Feed conversion, percent _____ 100
Yield MTEDA, wt. percent _____ 11
Yield TEDA, wt. percent _____ 10
Yield N-allylpiperazine, undetermined, but significant.

*Example XV*

In essentially the same manner as in Example IX, a mixture of 75% N-hydroxyethyl-3-methylpiperazine and 25% water was converted over an aluminum phosphate catalyst at 400° C. and feed and ammonia weight/hourly/space/velocities of 0.33 and 0.06, respectively. The following results were obtained:

Feed conversion, percent _____ 100
Yield MTEDA, wt. percent _____ 35
Yield TEDA, wt. percent _____ 6

*Example XVI*

Ethyltriethylenediamine was prepared in essentially the same manner as in Example IX, by the conversion of N-hydroxyethyl-3-ethylpiperazine over an aluminum phosphate catalyst at 400° C. and feed and ammonia weight/hourly/space/velocities of 0.5 and 0.1, respectively. The following results were obtained:

Feed conversion, percent _____ 100
Yield ETEDA (ethyltriethylenediamine) wt. percent _____ 50
Yield ethylpiperazine, wt. percent _____ 2
Yield TEDA, wt. percent _____ 2
Yield residue, wt. percent _____ 7

*Example XVII*

To demonstrate the superiority of hydrogen as a purge gas, an experiment was conducted in essentially the same manner as in Example IX, except that hydrogen was charged at a space velocity of 3440 cc./hr./cc./catalyst. Other reactor conditions were feed and ammonia weight/hourly/space/velocities of 0.53 and 0.03, respectively. The following results were obtained:

Feed conversion, percent _____ 100
Yield ETEDA, wt. percent _____ 55
Yield, TEDA, wt. percent _____ 2
Yield ethylpiperazine, wt. percent _____ 9
Yield residue, wt. percent _____ 9

The yield of ETEDA is 5 wt. percent higher than when no $H_2$ was used.

*Example XVIII*

A mixture of 2,5- and 2,6-dimethyltriethylenediamine, hereinafter abbreviated DMTEDA, was prepared by the conversion of a mixture of N,N'-dihydroxyethyl-2,5- and 2,6-dimethylpiperazine over aluminum phosphate catalyst at 400° C. as in Example IX with feed and ammonia weight/hourly/space/velocities of 0.6 and 0.1, respectively. The following results were obtained:

Feed conversion, percent _____ 100
Yield 2,5- plus 2,6-DMTEDA, wt. percent _____ 12
Yield vinyl-3,5-dimethylpiperazine, wt. percent ___ 1
Yield MTEDA, wt. percent _____ 5

*Example XIX*

In essentially the same manner as in Example IX, 2,5-dimethyltriethylenediamine was prepared by the conversion of N-hydroxyethyl-2,5-dimethylpiperazine over aluminum phosphate at 380° C. and feed and ammonia weight/hourly/space/velocities of 0.48 and 0.03, respectively. A hydrogen space velocity of 3440 cc./cc./catalyst/hr. was also used. The following results were also obtained:

Feed conversion, percent _____ 100
Yield, 2,5-DMTEDA, wt. percent _____ 29
Yield residue, wt. percent _____ 10
Yield 2,5-dimethylpiperazine, wt. percent _____ 18

*Example XX*

In essentially the same manner as in Example IX, 2,6-dimethyltriethylenediamine was prepared by the conversion of 4-N-hydroxyethyl-2,6-dimethylpiperazine over an aluminum phosphate catalyst at 388° C., and weight/hourly/space/velocities of feed and ammonia of 0.5 and 0.1, respectively. The following results were obtained:

Feed conversion, percent _____ 100
Yield 2,6-DMTEDA, wt. percent _____ 19
Yield 2,6-dimethylpiperazine, wt. percent _____ 15
Yield vinyl-3,5-dimethylpiperazine, wt. percent ___ 3
Yield residue, wt. percent _____ 6

*Example XXI*

In essentially the same manner as in Example IX, triethylenediamine was prepared by the cyclization of N-hydroxyethylpiperazine over an aluminum phosphate catalyst at 400° C. and feed and ammonia space velocities of 0.35 and 0.1, respectively. The following results were obtained:

Feed conversion, percent _____ 100
Yield TEDA, wt. percent _____ 33
Yield piperazine, wt. percent _____ 9
Yield residue, wt. percent _____ 17

*Example XXII*

In essentially the same manner as in Example IX, N-hydroxyethyl-3-methylpiperazine was converted over an iron phosphate catalyst at 400° C. and feed and ammonia weight/hourly/space/velocities of 1.0 and 0.2, respectively. The following results were obtained:

Feed conversion, percent _____ 100
Yield MTEDA, wt. percent _____ 32
Yield TEDA, wt. percent _____ 42
Yield residue, wt. percent _____ 12

*Example XXIII*

U.S. Patent No. 2,476,205 teaches the use of aluminum phosphate in the conversion of ethylenediamine to piperazine with no TEDA so reported. Although the patent claims aluminum phosphate, the forward indicates that basic aluminum phosphate was used as catalyst. Mellor, in volume 5, chapter 32, page 336, of "A Comprehensive Treatise of Inorganic and Theoretical Chemistry" (Longmons; Green & Company, 1946), describes basic aluminum phosphate as having the structure:

$$2AlPO_4—Al(OH)_3 \times nH_2O$$

although he indicates that there may be some variation in the ratio of $AlPO_4/Al(OH)_3$. Basic aluminum phosphate was prepared according to C. E. Monroe, American Journal of Science (3) 1, 329 (1871), by mixing a solution of potassium alum, i.e.,  $KAl(SO_4)_2 \times 12H_2O$, with a solution containing a threefold excess of disodium phosphate ($Na_2HPO_4$). The precipitate was washed until there were no more sulfate ions in the filtrate, dried at 105° C., then broken into 4–8 mesh chips and used at 400° C. Ethylenediamine was converted in essentially the same manner as reported for other amines over aluminum phosphate. The conditions were 400° C. and a WHSV of ethylenediamine of 1.6. The following results were obtained:

EDA conversion, percent _____ 90
Piperazine yield, wt. percent _____ 24
TEDA yield, wt. percent _____ 22
Losses yield, wt. percent _____ 36
Residue yield, wt. percent _____ 12

The above experiment was carried out for 5.16 hours. In a second experiment carried out for a duration of two hours and using ammonia at a WHSV of 0.57, TEDA was observed in the vapor chromatogram of the reactor effluent to about the same extent as in the above experiment; however, upon distillation of the effluent in such a short run, only one weight percent of TEDA was observed. The other results are shown below:

Conversion, percent _____ 70
Piperazine yield, wt. percent _____ 14
Losses yield, wt. percent _____ 61
Residue yield, wt. percent _____ 24

The basic aluminum phosphate catalyst converts N-hydroxyethyl-3-methylpiperazine with the following results being obtained:

Conversion, percent _____ 100
MTEDA yield, wt. percent _____ 41
TEDA yield, wt. percent _____ 6
Residue yield, wt. percent _____ 8

The foregoing results, in addition to demonstrating the superior results obtainable in the production of C-substituted diazabicyclo-(2.2.2)-octanes through the use of metal phosphate catalysts, also demonstarte the surprising discovery that in this art, and irrespective of the catalyst employed, conversion and yield are improved through the use of a C-substituted N-hydroxyethylpiperazine or N,N'-dihydroxyl C-substituted piperazine feed stock, in comparison with other feed stocks such as N-hydroxypropylpiperazines, N,N'-dihydroxypropylpiperazines, N'-aminopropylpiperazines and N,N'-diaminopropylpiperazines. Also, it is demonstrated that C-monoalkyl-N-hydroxyethyl or N,N'-dihydroxyethyl feed stocks are preferred.

*Example XXIV*

Monoethanolamine was brought into contact with aluminum phosphate with 4–8 mesh aluminum phosphate under reaction conditions including a temperature of 375° C., 1 atmosphere pressure, a monoethanolamine flow rate of about 1.15 g./cc. catalyst/hour and an ammonia flow rate of about 0.59 g./cc. catalyst/hour. Analysis of the crude reaction product gave the following results:

Monoethanolamine conversion, percent by wt. ____ 100
Mol percent yield of piperazine _____ 16
Mol percent yield of triethylenediamine _____ 27

*Example XXV*

Monoethanolamine was reacted over an 86% silica-14% alumina catalyst under reaction conditions including a temperature of about 378° C., 1 atmosphere pressure, a monoethanolamine flow rate of about 1–2 g./cc. catalyst/hour and an ammonia flow rate of about 0.6 g./cc. catalyst/hour. The total reactor effluent was condensed in a flask immersed in a Dry Ice-acetone condenser. The product was distilled and cut into an overhead fraction boiling through monoethanolamine and a residue fraction. The product analyzed gave the following results:

Monoethanolamine conversion, percent by wt. _____ 94
Mol percent yield of piperazine _____ 9
Mol percent yield of triethylenediamine _____ 8

*Example XXVI*

In essentially the same manner as described in Example I, diethanolamine was converted over an aluminum phosphate catalyst. The reaction conditions were: 430° C., 1 atmosphere pressure, a diethanolamine flow rate of 1.06 g./cc. catalyst/hour and an ammonia flow rate of 0.47 g./cc. catalyst/hour. The results were:

Diethanolamine conversion, percent by wt. _____ 100
Mol percent yield of morpholine _____ 6
Mol percent yield of piperazine _____ 8
Triethylenediamine yield _____ 19

*Example XXVII*

In essentially the same manner as in Example I, triehanolamine was converted over an aluminum phosphate catalyst. The reaction conditions were: 385° C., 1 atmosphere pressure, a triethanolamine flow rate of 0.45 g./cc. catalyst/hour and ammonia flow rate of 0.26 g./cc. catalyst/hour. The results were:

Triethanolamine conversion, percent by weight ____ 100
Mol percent yield of piperazine _____ 6
Mol percent yield of triethylenediamine _____ 8

*Example XXVIII*

In essentially the same manner described in Example I, isopropanolamine was converted over an aluminum phosphate catalyst. The conditions were: 385° C., 1 atmosphere pressure, an isopropanolamine flow rate of 1.46 g./cc. catalyst/minute and an ammonia flow rate of 0.58 g./cc. catalyst/minute. The results were:

Isopropanolamine conversion, percent _____ 85
Mol percent yield of 2,5-dimethylpiperazine _____ 20
Mol percent yield of trimethyltriethylenediamine
  isomers _____ 10

*Example XXIX*

Hydroxypropyldiethylenetriamine, the propylene oxide adduct of diethylenetriamine, was converted over an aluminum phosphate catalyst in essentially the same manner described in Example I. The reaction conditions were: 410° C., 1 atmosphere pressure, a hydroxypropyl-diethylenetriamine flow rate of 0.87 g./cc. catalyst/hour and an ammonia flow rate of 0.80 g./cc. catalyst/hour. The results are shown below:

Hydroxypropyldiethylenetriamine conversion, percent by weight _____ 100
Triethylenediamine yield, mol percent _____ 10
Methyltriethylenediamine, mol percent _____ 11

What is claimed is:
1. A method which comprises the steps of contacting a feed compound with a metal phosphate selected from the group consisting of aluminum phosphate, calcium phosphate and iron phosphate at a temperature within the range of about 250° to about 550° C. to form a reaction mixture comprising a diazabicyclo-(2.2.2)-octane corresponding to the feed compound, said feed compound having the formula:

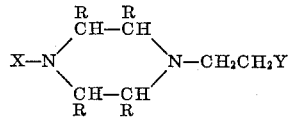

wherein:
R is selected from the group consisting of hydrogen, alkyl groups containing 1 to 12 carbon atoms, and cyclohexyl groups containing 6 to 12 carbon atoms;
Y is selected from the group consisting of —OH and —NH$_2$; and
X is selected from the group consisting of H and —CH$_2$CH$_2$Y.

2. A method as in claim 1 wherein the phosphate is aluminum phosphate.

3. A method which comprises the steps of contacting N-aminoethylpiperazine with a catalyst selected from the group consisting of iron phosphate, calcium phosphate and aluminum phosphate at a temperature within the range from about 270° to about 500° C. to provide a reaction product containing piperazine and triethylenediamine and recovering triethylenediamine from said reaction product.

4. A method as in claim 3 wherein from about 1 to about 10 mols of ammonia per mol of N-aminoethylpiperazine is employed as a co-reactant.

5. A method for the preparation of a 2-substituted diazabicyclo-(2.2.2)-octane which comprises the steps of contacting a feed stock with a catalyst selected from the group consisting of aluminum phosphate, iron phosphate and calcium phosphate at a temperature within the range of about 250° to about 550° C., said feed stock comprising a compound having the formula:

$$\begin{array}{c} R \quad R \\ CH-CH \\ X-N \diagup \qquad \diagdown N-CH_2CH_2Y \\ \diagdown CH-CH \diagup \\ R \quad R \end{array}$$

wherein:
R is selected from the group consisting of hydrogen, alkyl groups containing 1 to 12 carbon atoms, cyclohexyl, phenyl and alkylphenyl groups containing 7 to 12 carbon atoms;
Y is selected from the group consisting of —OH and —NH$_2$; and
X is selected from the group consisting of H and —CH$_2$CH$_2$Y.

6. A method as in claim 5 wherein the reaction is conducted in the presence of about 1 to about 15 mols of ammonia per mol of feed stock.

7. A method for the preparation of 2-methyltriethylenediamine which comprises the steps of contacting a feed stock selected from the group consisting of N-(hydroxyethyl)-3 - methylpiperazine, N,N' - (dihydroxyethyl) - 2-methylpiperazine, and mixtures thereof, with a catalyst selected from the group of aluminum phosphate, iron phosphate and calcium phosphate at a temperature within the range of about 250° to about 550° C. and a weight/hourly/space/velocity of about 0.1 to about 1.

8. A method for the preparation of 2-methyltriethylenediamine which comprises the steps of contacting a feed stock selected from the group consisting of N-(hydroxyethyl)-3-methylpiperazine, N,N'-(dihydroxyethyl)-2-methylpiperazine, and mixtures thereof, with an aluminum phosphate catalyst at a temperature within the range of about 300° to about 550° C. in the presence of added ammonia at a total weight/hourly/space/velocity within the range of about 0.1 to about 1.

9. A method as in claim 8 wherein the reaction is conducted in vapor phase at substantially atmospheric pressure.

10. In a method for the catalytic synthesis of a C-substituted diazabicyclo-(2.2.2)-octane, the improvement for enhancing conversion and selectivity which comprises employing as a feed stock for the synthesis a compound having the formula:

$$\begin{array}{c} R' \quad R \\ CH-CH \\ X-N \diagup \qquad \diagdown N-CH_2CH_2Y \\ \diagdown CH-CH \diagup \\ R \quad R \end{array}$$

wherein:
R and R' are members selected from the group consisting of hydrogen, alkyl groups containing 1 to 12 carbon atoms and cycloalkyl groups containing 6 to 12 carbon atoms;
Y is a member selected from the group consisting of —NH$_2$ and —OH; and
X is selected from the group consisting of H and —CH$_2$CH$_2$Y.

11. A method as in claim 10 wherein R' is alkyl, R is hydrogen and Y is —OH.

12. A method as in claim 11 wherein R is methyl.

13. A method for the production of a triethylenediamine which comprises contacting an alkanolamine and from about 1 to about 15 mols of ammonia per mol of alkanolamine with an aluminum phosphate catalyst at a temperature within the range of from 250° to about 550° C. and a flow rate of from about 0.1 to about 3.0 pounds of feed per pound of catalyst per hour to thereby provide a reaction product comprising a tirethylenediamine corresponding to the alkanolamine feed stock, said alkanolamine having the formula:

$$\begin{array}{c} R'' \\ \diagdown \\ N-CHRCHROH \\ \diagup \\ R'' \end{array}$$

wherein:
R' is selected from the group consisting of hydrogen and alkyl groups containing from 1 to 4 carbon atoms; and
R" is selected from the group consisting of hydrogen and —CH$_2$CHR—OH.

14. A method as in claim 13 wherein a temperature of about 350° to about 500° C. and wherein about 3 to about 10 mols of ammonia per mol of alkanolamine feed stock are employed, wherein the flow rate is within the range of about 0.5 to about 1.5 pounds of feed per pound of catalyst per hour and wherein the reaction is conducted at substantially atmospheric pressure.

15. A method as in claim 14 wherein the alkanolamine is monoethanolamine.

16. A method as in claim 14 wherein the alkanolamine is diethanolamine.

17. A method as in claim 14 wherein the alkanolamine is triethanolamine.

18. A method as in claim 14 wherein the alkanolamine is isopropanolamine.

19. A method which comprises contacting hydroxypropyldiethylenetriamine and from about 1 to 15 mols of ammonia per mol of hydroxypropyldiethylenetriamine with an aluminum phosphate catalyst at a temperature of from about 250° to about 550° C. and a flow rate of from about 0.1 to about 3.0 pounds of hydroxypropyldiethylenetriamine per pound of catalyst to thereby provide a reaction product comprising methyltriethylenediamine and recovering said methyltriethylenediamine.

No references cited.

ALEX MAZEL, *Primary Examiner.*

JAMES W. ADAMS, *Assistant Examiner.*